United States Patent
Gadi

(10) Patent No.: US 6,629,246 B1
(45) Date of Patent: Sep. 30, 2003

(54) SINGLE SIGN-ON FOR A NETWORK SYSTEM THAT INCLUDES MULTIPLE SEPARATELY-CONTROLLED RESTRICTED ACCESS RESOURCES

(75) Inventor: Guy Gadi, Givatayim (IL)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/301,642

(22) Filed: Apr. 28, 1999

(51) Int. Cl.$^7$ ................................................ G06F 11/30
(52) U.S. Cl. ........................................ 713/202; 713/201
(58) Field of Search ................................. 713/202, 201

(56) References Cited

U.S. PATENT DOCUMENTS

| | | | |
|---|---|---|---|
| 5,684,950 A | | 11/1997 | Dare et al. ............. 395/187.01 |
| 5,719,941 A | * | 2/1998 | Swift et al. .................... 380/25 |
| 5,774,650 A | * | 6/1998 | Chapman et al. ........... 395/186 |
| 5,931,948 A | * | 8/1999 | Morisawa et al. .......... 713/202 |
| 6,209,104 B1 | * | 3/2001 | Jalili .......................... 713/202 |
| 6,308,273 B1 | * | 10/2001 | Goertzel et al. ............ 713/201 |

\* cited by examiner

Primary Examiner—Norman Wright
(74) Attorney, Agent, or Firm—Finnegan, Henderson, Farabow, Garrett & Dunner, L.L.P.

(57) ABSTRACT

A method and system are provided for authenticating users in a client-server system in a way that allows a user to sign-on to numerous servers using a different password for each server, while still only having to remember a single master password. According to one aspect of the invention, a client generates a first set of server-specific authentication information for a first server based on master authentication information stored at the client and data associated with the first server. The client then supplies the first server-specific authentication information to the first server to access restricted resources controlled by the first server. The client generates a second set of second server-specific authentication information for a second server based on the same master authentication information. However, to generate the server-specific authentication information for the second server, the master resource information is combined with data associated with the second server. The client supplies the second server-specific authentication information to the second server to access restricted resources controlled by the second server. Both the first and the second server-specific authentication information are different from the master authentication information, and the first server-specific authentication information is different from the second server-specific authentication information. Thus, the administrators of the various servers do not have information that would allow them to access the user's account at the other servers.

42 Claims, 2 Drawing Sheets

SINGLE SIGN-ON FOR A NETWORK SYSTEM THAT INCLUDES MULTIPLE SEPARATELY-CONTROLLED RESTRICTED ACCESS RESOURCES

FIELD OF THE INVENTION

The present invention relates to networked computer systems, and more specifically to user authentication in a network system that includes multiple separately-controlled restricted access resources.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML pages, and are therefore often referred to as "listeners".

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

Because servers on the Internet can be accessed by a multitude of unidentifiable clients, several protection schemes have been developed to protect against unauthorized access to restricted information. One approach used to prevent unauthorized access to restricted information is to require clients to provide certain authorization information before they can have access to information on a particular server. This authorization information typically consists of such items as a userid/password combination, a particular IP address, specific domain name or other information that can identify a particular user and/or machine attempting to access information.

Of the various types of authorization information that may be used to authenticate a user, the userid/password combination is often favored because it is not tied to a particular machine or service provider. Thus, as long as users can remember their userids and passwords, they can gain access to restricted sites from any machine connected to the Internet. When the authorization information consists of a userid/password combination, the user provides the userid/password combination to the web server, in some manner, before the web server will deliver the restricted information to the user.

Once the user has submitted the authorization information to the server, the server determines whether the user is in fact authorized to access the restricted information. If the server determines that the user is authorized to access the restricted information, then the restricted information is sent to the user. Otherwise, the user is not allowed to access the restricted information.

For any given user, authorization information is frequently required to access the restricted resources of numerous on-line service providers. Each separately-controlled web server requests a user to provide authorization information (e.g. a userid/password combination) before allowing access to its products or services. Hence, if a user is subscribed with two separately-controlled on-line services, such as a news provider and a financial services provider, each service provider will request a userid/password combination before allowing the user access to its services.

This creates a problem for users because they must recall the password for each separately-controlled restricted resource. That is, when any given user subscribes to a multitude of such services, the user must remember a multitude of passwords. Consequently, users have adopted various techniques to avoid having to retain a multitude of distinct passwords in their memory.

One approach to avoid memorizing multiple passwords is for users to retain a written copy of their authorization information on or near their computer terminals. Thus, when asked for their userid/password combination, they can simply read it rather than recall it from memory. However, this approach jeopardizes security because third parties may easily obtain the authorization information from the written notes, and thereby gain unauthorized access to all of the service providers listed.

In another approach to avoid memorizing multiple passwords, users use the same password for all of their service providers. Again, this approach jeopardizes security because an employee of one service provider may try to use a user's password for unauthorized access to restricted resources controlled by another service provider. For example, a user may use the password "mypass" to access a site for reading sporting news, and also to access a separately-controlled site for managing the user's bank account. An employee of the provider of the sporting news site knows the user's password for the sporting news site, and may attempt to access the user's bank account using the same password. Because the user uses the same password for both services, the sporting news employee can break in to the user's bank account.

Based on the foregoing, it is desirable to provide a way to allow users to avoid having to memorize multiple passwords without jeopardizing security.

SUMMARY OF THE INVENTION

A method and system are provided for authenticating users in a client-server system in a way that allows a user to sign-on to numerous servers using a different password for each server, while still only having to remember a single master password.

According to one aspect of the invention, a client generates a first set of site-specific authentication information for a first server based on master authentication information stored at the client and data associated with the first server. The client then supplies the first site-specific authentication information to the first server to access restricted resources controlled by the first server. The client generates a second set of second site-specific authentication information for a second server based on the same master authentication information. However, to generate the site-specific authentication information for the second server, the master resource information is combined with data associated with the second server. The client supplies the second site-specific authentication information to the second server to access restricted resources controlled by the second server.

Both the first and the second site-specific authentication information are different from the master authentication information, and the first site-specific authentication information is different from the second site-specific authentication information. Thus, the administrators of the various servers do not have information that would allow them to access the user's account at the other servers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for single sign-on for a network system that includes multiple separately controlled restricted access resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
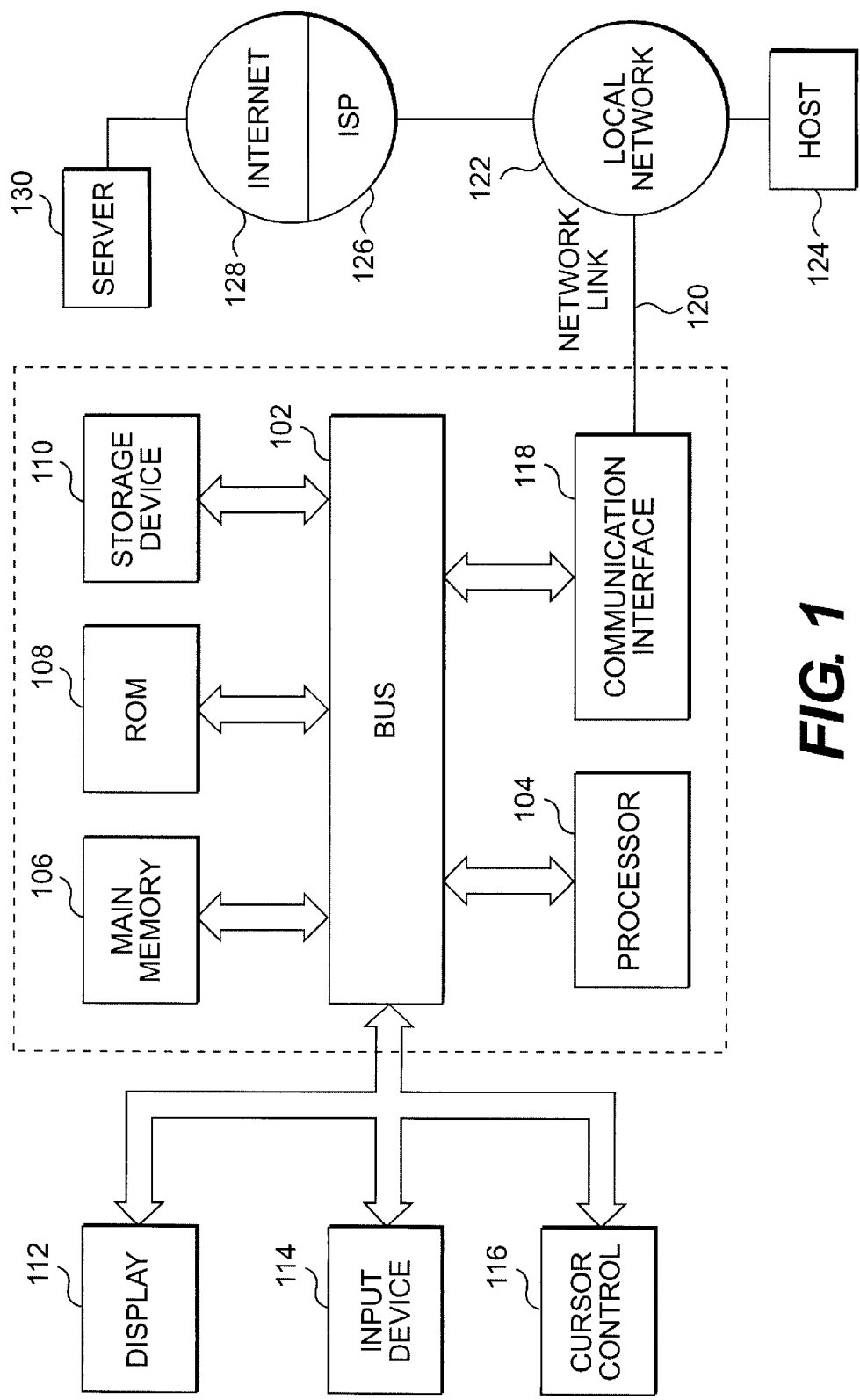
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for signing on to restricted services using the techniques described hereafter. According to one embodiment of the invention, a single sign-on mechanism is provided in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for a single sign-on mechanism as described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

A single sign-on mechanism is provided which allows a user to provide different passwords to different sites while still only having to remember a single "master" password. In general, the user enters the master password into a client-side module that is responsible for providing passwords to restricted sites. When a restricted site requests a password, the client-side module generates a site-specific password that is derived from (1) the master password and (2) site-specific information. According to one embodiment, the techniques used to derive the site-specific password are such that the master password cannot be determined based on the site-specific password.

After deriving the site-specific password, the client-side module provides the site-specific password to the restricted site to authenticate the user at the restricted site. This process may be repeated at any number or restricted sites, where each site is provided a different site-specific password. The site-specific passwords that are supplied to different sites are different because they are derived, in part, from different site-specific information. Because different site-specific passwords are provided to different restricted sites, the administrators of any given restricted site will not know or be able to infer a user's password at other restricted sites.

According to one embodiment, not only does a user have to only remember a single password, but the user need only provide the master password once per session. After providing the master password, the authentication process is performed at each restricted site by the client-side module in a manner that is transparent to the user.

According to one aspect of the invention, the client-side module may itself be sent to the client from a server. If a client-side module thus transmitted detects the existence of a similar client-side module at the client, then the newly-arrived client-side module causes the first-arrived client-side module to send a site-specific password to a server based on the master password already entered by the user in the first-arrived client module. On the other hand, if the client-side module does not detect the existence of a similar client-side module, then the client-side module requests the master password from the user, and sends a site-specific password to a server based on the master password and site-specific information.

EXEMPLARY SIGN-ON PROCESS

Figure 2:
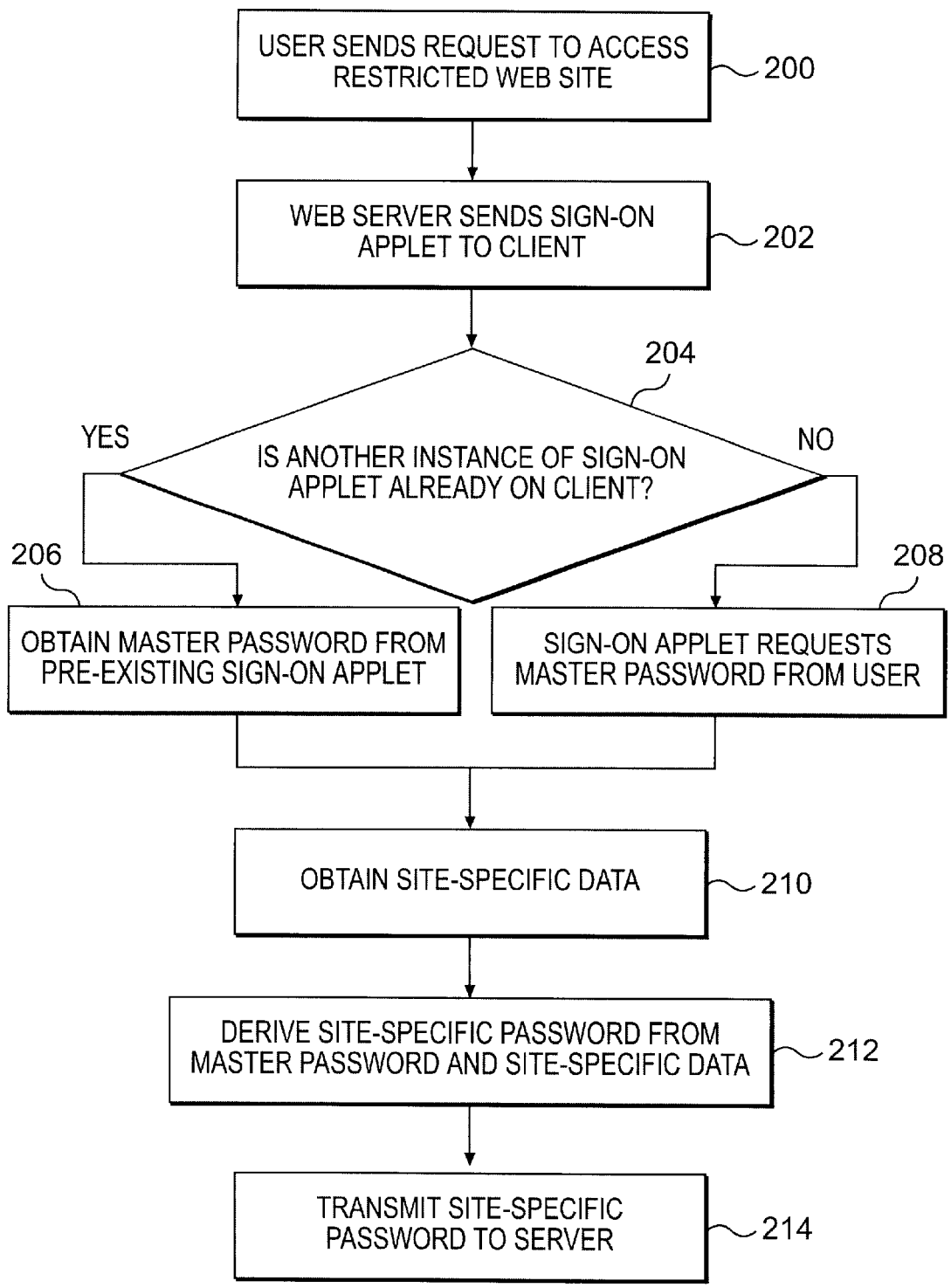
FIG. 2 is a flowchart that illustrates steps for signing on to restricted sites according to an embodiment of the invention.

FIG. 2 is a flow chart that illustrates steps for signing on to restricted sites according to an embodiment of the invention. For the purpose of explanation, the sign-on techniques will be described herein in the context of the World Wide Web. In this context, a browser executing on a client requests information from web servers in response to input from a user. The requests typically include Universal Resource Locators (URLs), which identify the resources that the user desires to access.

It should be noted, however, that the present invention is not restricted to any particular environment. Rather, it may be employed in any environment in which a user must be authenticated by more than one mechanism, module, server or system. The invention is particularly valuable when the mechanisms, modules, servers or systems with which the user must be authenticated are not controlled by the same source.

Referring to FIG. 2, at step 200 a user sends a request to access a restricted web site. This step may be accomplished, for example, by the user requesting delivery to the client (i.e. a browser) of a "log on" page for the restricted site. The user may issue such a request by selecting a hyperlink that resides on a previously retrieved web page, by typing the URL of the restricted web site into a text box on the browser, or by using any one of various other site selection mechanisms.

At step 202, the web server that controls the restricted web site sends a sign-on module to the browser that requested access to the web site. According to one embodiment of the invention, the sign-on module is an active content component, such as a JAVA applet, an ActiveX control, or a browser "plug-in". For the purpose of explanation, it shall be assumed that the sign-on module is a JAVA applet that is embedded in the log-on page, and that is transmitted to the browser in the form of JAVA byte code. A JAVA virtual machine in the browser executes the JAVA byte code upon receiving it. The remaining steps 204, 206, 208, 210, 212 and 214 are performed by the sign-on applet as it executes within the JAVA virtual machine on the client.

At step 204, the sign-on applet determines whether there is another instance of the sign-on applet already running on the client. If another instance of the sign-on applet is not already running on the client, then control passes to step 208 where the sign-on applet requests the master password from the user. If, on the other hand, another instance of the sign-on applet is already running on the client, then the user would have already entered the master password into the previously-existing sign-on applet, and control passes to step 206. At step 206, the newly-arrived sign-on applet obtains the master password from the previously-existing sign-on applet.

At step 210, the sign-on applet obtains site-specific data. The site-specific data may be any data that specifically identifies the site to which the user is seeking access. For example, site-specific data may be the URL of the web site that the user is attempting to access. Alternatively, the site-specific data may the IP address of the site the user is attempting to access, or a combination of the URL and the IP address of the site. Various other forms of site-specific data may be used. Consequently, the present invention is not limited to any particular type of site-specific data.

According to one embodiment, the site-specific data is encoded in the CodeBase of the applet. In such an embodiment, the site-specific data may be obtained in step 210 by extracting the CodeBase of the applet.

At step 212, the applet derives a site-specific password based on the master password and the site-specific data. This step may be represented by the formula:

$$SP=H[PW+CB]$$

where SP is the site-specific password, PW is the master password, CB is the CodeBase of the applet, H[ ] is a secure, one-way hash function, and "+" represents an operation that combines PW and CB.

According to one embodiment, the combining operation used to combine PW and CB prior to; applying the hash function H[ ] is a simple binary concatenation operation, and the hash function H[ ] is the Secure Hash Function SHA-1 described in Federal Information Processing Standards Publication 180-1 issued by the National Institute of Standards and Technology. However, various hash functions and combining operations may alternatively be used by the applet, and the present invention is not limited to any particular type of hash function or combining operation. For example, H[ ] may alternatively be the MD5 hash function which is described in detail in B. Schneier, "Applied Cryptography" (New York: John Wiley & Sons, Inc., 2d ed. 1996), at pp. 429–431 and pp. 436–441.

At step 214, the site-specific password generated at step 212 is transmitted to the web server that controls the restricted access web site. The process of submitting the password may be accomplished, for example, by the applet (1) constructing a new URL that encodes the site-specific password, and (2) causing the browser to navigate to the new URL. The web server that controls the restricted access web site will then compare the site-specific password against its user base, and determine whether the user is allowed to access the restricted site. Assuming that the user has permission to access the restricted access web site, the web server will respond by supplying a restricted resource. For example, if the restricted resource is a web page, the web server will respond by sending the restricted web page to the browser.

The steps illustrated in FIG. 2 are repeated every time a user attempts to access a restricted web site. After accessing the first restricted web site in a session, a copy of the applet will be present on the client. Consequently, step 206, in which the user is prompted for the master password, will not be repeated when the user attempts to access subsequent restricted web sites. Thus, the sign-on process executed for those subsequent servers will be transparent to the user.

THE SIGN-ON MODULE

In the embodiment discussed above with reference to FIG. 2, the sign-on module is a JAVA applet that is sent to the browser every time the user attempts to log on to a restricted site. According to one embodiment of the invention, the sign-on module has two components: a "resident" component and a "transitory" component. The resident component of the sign-on module remains in the browser even after the user navigates to a different web site than the site that transmitted the sign-on module.

The transitory component is a small log-in window that prompts the user for a username and password. When the user enters a master username/password combination into the log-in window, the transitory component generates the site-specific password based on the master username/password and site-specific data encoded in the CodeBase of the sign-on module. After generating the site-specific password, the sign-on module sends the site-specific password to the web server. In addition, the transitory component sends a copy of the master username/password combination to the resident component of the sign-on module. The resident component of the sign-on module stores the username/password in the client's memory.

When the user navigates to another restricted site, the web server that controls the new site transmits another instance of the sign-on module to the user's browser. The second sign-on module differs from the first sign-on module in that its CodeBase encodes site-specific site for the second restricted site. Upon detecting the existence of the resident component of a previously delivered instance of the sign-on module, the second sign-on module does not present the user with a log-on window. Rather, the second sign-on module retrieves the master username/password from the pre-existing resident component. The second sign-on module then proceeds to generate a site-specific password for the second site, and transparently sign the user on to the second site.

To ensure security, the sign-on modules are "signed", according to one embodiment of the invention. That is, they encode a signature that identifies the source (i.e. developer) of the sign-on module. If the sign-on module delivered to the user's browser is not from a source trusted by the user, then the user can prevent the sign-on module from executing, or may simply refuse to supply the master username/password information. Similarly, a pre-existing resident component of the sign-on module will not deliver the master username/password information to a subsequently arriving sign-on module unless the subsequently arriving sign-on module's signature identifies a trusted source. According to one embodiment, the sign-on modules used by various separately-controlled restricted sites will be from the same source, and those sign-on modules will only trust other sign-on modules from the same source.

According to an alternative embodiment, the sign-on modules used by various separately-controlled restricted sites may be from different sources, may implement different hash functions, and may be implemented using different forms of active content. However, they may be configured to supply the master authentication information to each other upon the sign-on module that is storing the master authentication information verifying that the sign-on module that requires the master authentication information is from a trusted source.

In the foregoing specification, the invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for authenticating users in a client-server system, the method comprising the steps of:
   a client generating first server-specific authentication information for a first server based on master authentication information stored at said client and data associated with said first server;
   said client supplying said first server-specific authentication information to said first server to access restricted resources controlled by said first server; and wherein said first server-specific authentication information is different from said master authentication information.

2. The method of claim 1 further comprising the steps of:

said client generating second server-specific authentication information for said second server based on said master authentication information and data associated with said second server; and said client supplying said second server-specific authentication information to said second server to access restricted resources controlled by said second server;

wherein said second server-specific authentication information is different from said master authentication information; and wherein said first server-specific authentication information is different from said second server-specific authentication information.

3. The method of claim 2 further comprising the steps of:

said client receiving a first request from said first server for said first server-specific authentication information;

said client requesting a user to supply said master authentication information in response to said first request;

said client storing said authentication information in response to receiving said master authentication information from said user;

said client receiving a second request from said second server for said second server-specific authentication information; and said client performing the following steps without again requesting said user to supply said master authentication information:

generating said second server-specific authentication information; and supplying said second server-specific authentication information to said second server.

4. The method of claim 2 further comprising the steps of:

said client receiving a first client-side sign-on module from said first server;

wherein said first client-side sign-on module performs the steps of:

generating said first server-specific authentication information for said first server; and supplying said first server-specific authentication information to said first server;

said client receiving a second client-side sign-on module from said second server;

wherein said second client-side sign-on module performs the steps of:

generating said second server-specific authentication information for said second server; and supplying said second server-specific authentication information to said second server.

5. The method of claim 4 further comprising the steps of:

said first client-side sign-on module requesting master authentication information from a user;

said first client-side sign-on module storing said master authentication information in memory on said client in response to receiving said master authentication information from said user.

6. The method of claim 5 further comprising the steps of:

said second client-side sign-on module detecting said first client-side sign-on module in said client; and said second client-side sign-on module requesting said master authentication information from said first client-side sign-on module.

7. The method of claim 6 further comprising the steps of:

the first client-side sign-on module responding to said second client-side sign-on module by determining whether a signature associated with said second client-side sign-on module indicates that said second client-side sign-on module is from a trusted source;

if said signature associated with said second client-side sign-on module indicates that said second client-side sign-on module is from a trusted source, then said first client-side sign-on module supplying said second client-side sign-on module with said master authentication information.

8. The method of claim 1 further comprising the step of requesting a user to supply said master authentication information to said client in response to said first server requesting said first server-specific authentication information from said client.

9. The method of claim 1 further comprising the steps of:

said client responding to a request from said first server for said first server-specific information by determining whether the client currently stores master authentication information;

if said client determines that said client currently stores master authentication information, then said client performing the step of generating said first server-specific authentication information without requesting said master authentication information from a user; and if said client determines that said client does not currently store master authentication information, then said client requesting said user to provide said master authentication information, and storing said master authentication in response to receiving said master authentication information from said user.

10. The method of claim 1 further comprising the steps of:

said client receiving a first client-side sign-on module from a server;

wherein said first client-side sign-on module performs the steps of:

generating said first server-specific authentication information for said first server; and supplying said first server-specific authentication information to said first server.

11. The method of claim 10 wherein the step of receiving said first client-side sign-on module is performed by receiving said first client-side sign-on module from said first server in response to said client requesting restricted resources from said first server.

12. The method of claim 10 wherein the step of receiving a first client-side sign-on module includes receiving an active content module, wherein the active content module includes one or more of a plug-in module, a JAVA applet, and an ActiveX component.

13. The method of claim 10 wherein the first client-side sign-on module performs the step of generating said first server-specific authentication information based on data associated with said first site after extracting said data associated with said first server from the CodeBase of said first client-side sign-on module.

14. The method of claim 1 wherein the step of said client storing master authentication information includes the step of said client storing one or more of a username, an IP address, and a master password.

15. The method of claim 1 wherein the step of generating said first server-specific authentication information includes generating said first server-specific authentication information based upon a secure one-way hash function.

16. The method of claim 1 wherein said data associated with said first server includes one or more of a URL, an IP address, a software vendor number, and unique server identifier.

17. The method of claim 1 wherein:
said first server is a web server;
the web server requests said first server-specific authentication information in response to a browser on the client transmitting over the World Wide Web a URL that identifies a restricted web page controlled by the web server; and
the step of supplying said first server-specific authentication information is performed by transmitting the first server-specific authentication information to the web server.

18. A method for authenticating users in a client-server system, the method comprising the steps of:
a server receiving a request for restricted resources from a client;
said server transmitting to said client a client-side sign-on module which, when executed at said client, generates server-specific authentication information based on data associated with said server and master authentication information stored in said client; and
said server receiving said server-specific authentication information from said client-side sign-on module as said client-side sign-on module executes on said client.

19. The method of claim 18 wherein the step of transmitting said client-side sign-on module includes transmitting a client-side module that has encoded in its CodeBase the data, associated with said server, that is used in combination with said master authentication information to generate said server-specific authentication information.

20. The method of claim 18 wherein said sign-on module is configured to ask a user of said client for said master authentication information if no pre-existing sign-on module is detected on said client, and to ask said pre-existing sign-on module for said master authentication information if a pre-existing sign-on module is detected on said client.

21. A computer-readable medium carrying one or more sequences of instructions for authenticating users in a client-server system, wherein execution of the one or more sequences of instructions by one or more processors causes the one or more processors to perform the steps of:
a client generating first server-specific authentication information for a first server based on master authentication information stored at said client and data associated with said first server;
said client supplying said first server-specific authentication information to said first server to access restricted resources controlled by said first server; and
wherein said first server-specific authentication information is different from said master authentication information.

22. The computer-readable medium of claim 21 further comprising instructions for performing the steps of:
said client generating second server-specific authentication information for said second server based on said master authentication information and data associated with said second server; and
said client supplying said second server-specific authentication information to said second server to access restricted resources controlled by said second server;
wherein said second server-specific authentication information is different from said master authentication information; and wherein said first server-specific authentication information is different from said second server-specific authentication information.

23. The computer-readable medium of claim 18 further comprising instructions for performing the step of requesting a user to supply said master authentication information to said client in response to said first server requesting said first server-specific authentication information from said client.

24. The computer-readable medium of claim 21 further comprising instructions for performing the steps of:
said client responding to a request from said first server for said first server-specific information by determining whether the client currently stores master authentication information;
if said client determines that said client currently stores master authentication information, then said client performing the step of generating said first server-specific authentication information without requesting said master authentication information from a user; and
if said client determines that said client does not currently store master authentication information, then said client requesting said user to provide said master authentication information, and storing said master authentication in response to receiving said master authentication information from said user.

25. The computer-readable medium of claim 24 further comprising instructions for performing the steps of:
said client receiving a first client-side sign-on module from a server;
wherein said first client-side sign-on module performs the steps of:
generating said first server-specific authentication information for said first server; and
supplying said first server-specific authentication information to said first server.

26. The computer-readable medium of claim 25 wherein the step of receiving said first client-side sign-on module is performed by receiving said first client-side sign-on module from said first server in response to said client requesting restricted resources from said first server.

27. The computer-readable medium of claim 24 wherein the step of said client storing master authentication information includes the step of said client storing one or more of a username, an IP address, and a master password.

28. The computer-readable medium of claim 27 further comprising instructions for performing the steps of:
said first client-side sign-on module requesting master authentication information from a user;
said first client-side sign-on module storing said master authentication information in memory on said client in response to receiving said master authentication information from said user.

29. The computer-readable medium of claim 28 wherein the step of receiving a first client-side sign-on module includes receiving an active content module, wherein the active content module includes one or more of a plug-in module, a JAVA applet, and an ActiveX component.

30. The computer-readable medium of claim 29 further comprising instructions for performing the steps of:
the first client-side sign-on module responding to said second client-side sign-on module by determining whether a signature associated with said second client-side sign-on module indicates that said second client-side sign-on module is from a trusted source;
if said signature associated with said second client-side sign-on module indicates that said second client-side sign-on module is from a trusted source, then said first client-side sign-on module supplying said second client-side sign-on module with said master authentication information.

31. The computer-readable medium of claim 28 wherein the first client-side sign-on module performs the step of generating said first server-specific authentication information based on data associated with said first site after extracting said data associated with said first server from the CodeBase of said first client-side sign-on module.

32. The computer-readable medium of claim 24 wherein the step of generating said first server-specific authentication information includes generating said first server-specific authentication information based upon a secure one-way hash function.

33. The computer-readable medium of claim 32 further comprising instructions for performing the steps of:
said second client-side sign-on module detecting said first client-side sign-on module in said client; and
said second client-side sign-on module requesting said master authentication information from said first client-side sign-on module.

34. The computer-readable medium of claim 24 wherein said data associated with said first server includes one or more of a URL, an IP address, a software vendor number, and unique server identifier.

35. The computer-readable medium of claim 24 wherein:
said first server is a web server;
the web server requests said first server-specific authentication information in response to a browser on the client transmitting over the World Wide Web a URL that identifies a restricted web page controlled by the web server; and
the step of supplying said first server-specific authentication information is performed by transmitting the first server-specific authentication information to the web server.

36. The computer-readable medium of claim 21 further comprising instructions for performing the steps of:
said client receiving a first request from said first server for said first server-specific authentication information;
said client requesting a user to supply said master authentication information in response to said first request;
said client storing said authentication information in response to receiving said master authentication information from said user;
said client receiving a second request from said second server for said second server-specific authentication information; and
said client performing the following steps without again requesting said user to supply said master authentication information:
generating said second server-specific authentication information; and
supplying said second server-specific authentication information to said second server.

37. The computer-readable medium of claim 36 further comprising instructions for performing the steps of:
said client receiving a first client-side sign-on module from said first server;
wherein said first client-side sign-on module performs the steps of:
generating said first server-specific authentication information for said first server; and
supplying said first server-specific authentication information to said first server;
said client receiving a second client-side sign-on module from said second server;
wherein said second client-side sign-on module performs the steps of:
generating said second server-specific authentication information for said second server; and
supplying said second server-specific authentication information to said second server.

38. The client-server system of claim 37 wherein said particular server is said first server.

39. A computer-readable medium carrying one or more sequences of instructions for authenticating users in a client-server system, wherein execution of the one or more sequences of instructions by one or more processors causes the one or more processors to perform the steps of:
a server transmitting to a client a client-side sign-on module which, when executed at said client, generates server-specific authentication information based on data associated with said server and master authentication information stored in said client; and
said server receiving said server-specific authentication information from said client-side sign-on module as said client-side sign-on module executes on said client.

40. The computer-readable medium of claim 39 wherein the step of transmitting said client-side sign-on module includes transmitting a client-side module that has encoded in its CodeBase the data, associated with said server, that is used in combination with said master authentication information to generate said server-specific authentication information.

41. The computer-readable medium of claim 39 wherein said sign-on module is configured to ask a user of said client for said master authentication information if no pre-existing sign-on module is detected on said client, and to ask said pre-existing sign-on module for said master authentication information if a pre-existing sign-on module is detected on said client.

42. A client-server system comprising:
a client;
a plurality of servers;
a network operatively connecting said client to said plurality of servers to allow communication between said client and said plurality of servers;
said plurality of servers including at least a first server configured to respond to a resource request issued by said client by sending to said client a sign-on module;
wherein said sign-on module is configured to perform the following steps while executing on said client:
retrieving master authentication information stored in said client,
combining said master authentication information with server-specific data;
generating server-specific authentication information based on said master authentication information and the server-specific data; and
transmitting said server-specific authentication information to a particular server of said plurality of servers.

* * * * *